March 9, 1965 W. A. GRILL 3,172,781

APPARATUS FOR APPLYING LIQUID TO MICRO-MODULE

Filed April 18, 1961 2 Sheets-Sheet 1

INVENTOR.
WILLIAM A. GRILL
BY John A. Harvey
ATTORNEY

APPARATUS FOR APPLYING LIQUID TO MICRO-MODULE

Filed April 18, 1961

INVENTOR.
WILLIAM A. GRILL
BY
John A. Harvey
ATTORNEY 3,172,781

APPARATUS FOR APPLYING LIQUID TO MICRO-MODULE

William A. Grill, Parsippany, N.J., assignor, by mesne assignments, to General Mills, Inc., Minneapolis, Minn., a corporation of Delaware Filed Apr. 18, 1961, Ser. No. 103,926
6 Claims. (Cl. 118—211)

This invention relates to an apparatus for applying liquid to a surface. More particularly, this invention relates to an apparatus for applying a liquid, such as a metal-containing liquid wherein a metal or a metal-containing compound is suspended or dissolved, at a plurality of points to a surface, such as the surface of a solid object. Still more particularly, this invention relates to a micro-module land printer.

In the preparation or fabrication of miniaturized electronic equipment, modules, micro-modules and layers or wafers of ceramic material having electrical circuits imprinted thereon are often employed. These modules or wafers, particularly the micro-modules, are relatively small in size, usually having a surface area below about one square inch on one face thereof and a thickness of about 0.01 inch, more or less. It is desirable in the fabrication of electronic equipment employing micro-modules as components thereof to provide these modules with vertical apertures and peripheral grooves extending between opposed surfaces and having conductive materials placed within these apertures and grooves and overlapping the upper and lower surfaces of the module adjacent each aperture and groove. This structure enables electrical circuits to be completed, through the conductive material placed within the apertures and grooves, between upper and lower surfaces of the micro-module or the use of the conductive grooves as electrical terminals or both.

In the past it has been a practice to actually lay down by hand, such as by hand painting, the electrically conductive material in the grooves and at other desired areas. It has also been a practice when the micro-module is pierced by a hole to fix within the hole an electrically conductive metal eyelet serving essentially as a soldering terminal of electrical circuitry. The installation of these eyelets and the hand painting of these micro-modules to lay down a film of electrically conductive material has been a difficult, time-consuming and, accordingly, an expensive operation. Also the electrical properties of the film laid down by hand painting have not been uniform.

It is an object of this invention to provide an improved apparatus for rapidly and uniformly applying at desired locations a conductive film extending between and overlapping the upper and lower surfaces of a wafer-like article.

It is another object of this invention to provide an improved apparatus for laying down or depositing a liquid on micro-modules, particularly onto the surface of vertical apertures and peripheral grooves thereof.

It is another object of this invention to provide a rapid apparatus for laying down or imprinting lands of electrically conductive material possessing uniform electrical properties on micro-modules and the like.

Still another object of this invention is to provide an apparatus for applying or printing liquid onto vertically extending apertures and peripheral grooves or notches provided on micro-modules, such as ceramic wafers and the like, in order to provide in simple and reliable manner electrically connected lands on opposite surfaces of the micro-module for use in completing electrical circuits between electrical components or electrical conductors placed on opposite sides of the micro-modules and the like.

How these and other objects of this invention are achieved will become apparent in the light of the accompanying disclosure made with reference to the accompanying drawings wherein.

Figures 1, 2, 3, 4:
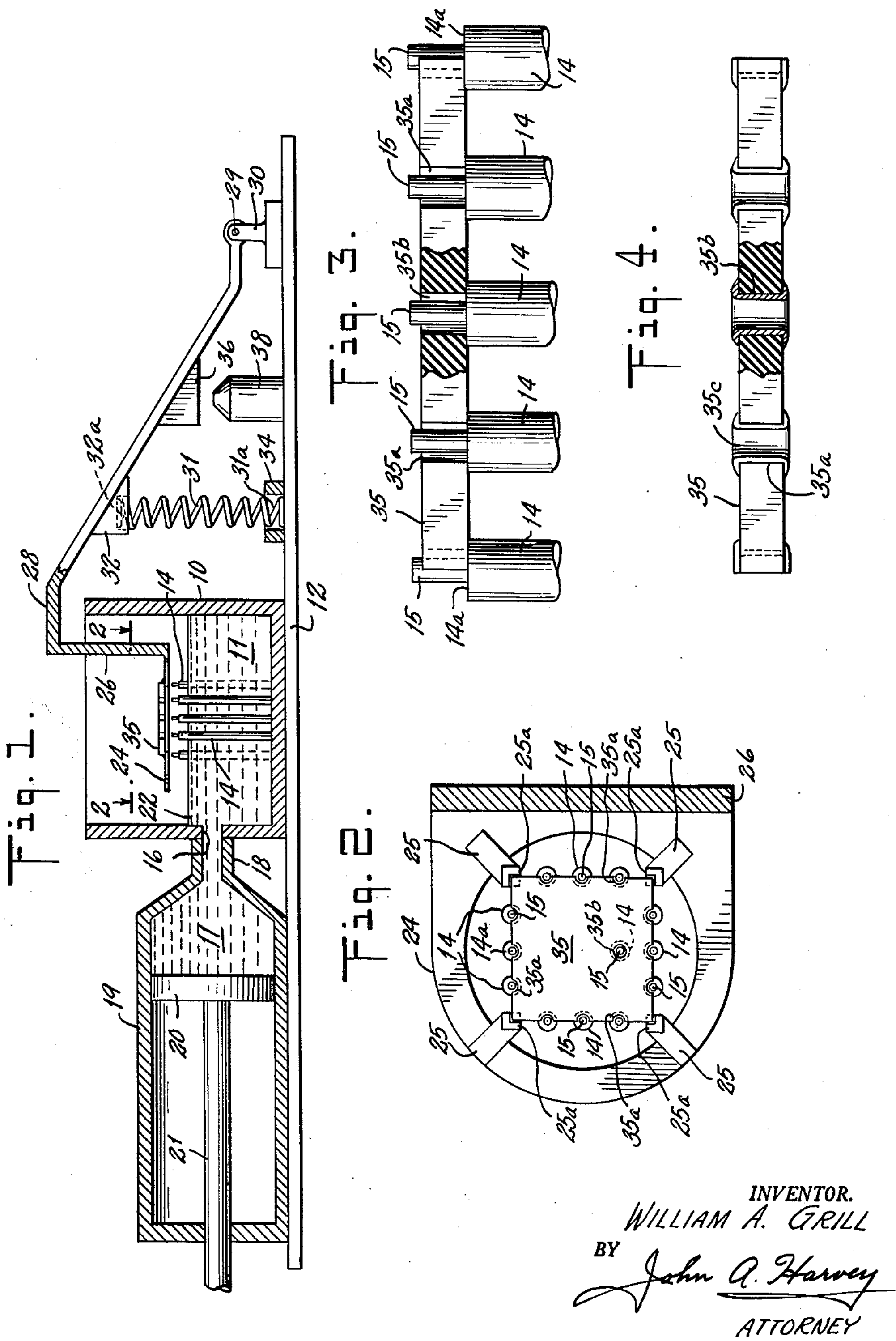
FIG. 1 is a simplified elevational view illustrating in cross-section an apparatus of the invention for depositing a conductive film on the edge surfaces of apertures and peripheral notches of a micro-module.
FIG. 2 is an enlarged partial view taken along line 2—2 of FIG. 1 illustrating a frame for releasably supporting, with very close positional tolerances, an apertured and peripherally notched micro-module.
FIG. 3 is an enlarged, partial elevational view of a micro-module supported on printing surfaces of an apparatus embodying the invention.
FIG. 4 is an enlarged side view of the FIG. 3 micro-module after being processed by the FIG. 1 apparatus and by which its apertures and peripheral notches together with upper and lower surface portions adjacent thereto have had deposited thereon an electrically conductive metallic paint.
Figure 5:
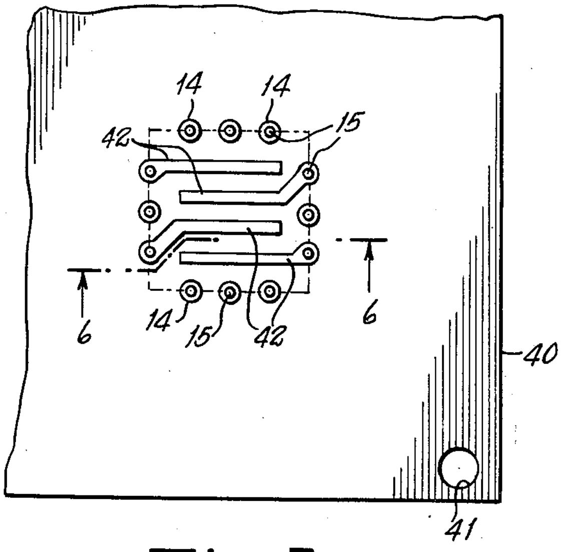
Figure 6:
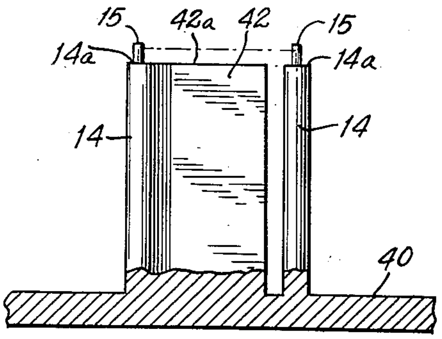
Figure 11:
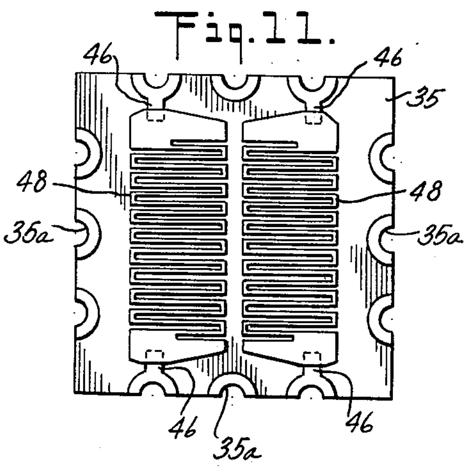
Figure 7:
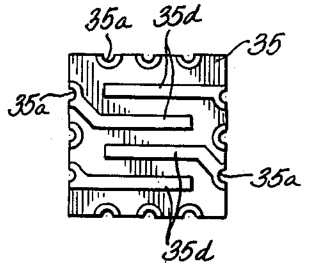
Figure 8:
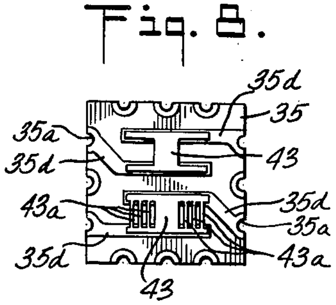
Figure 10:
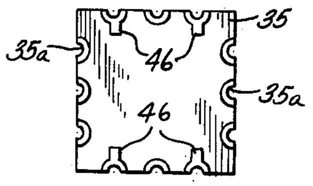
Figure 9:
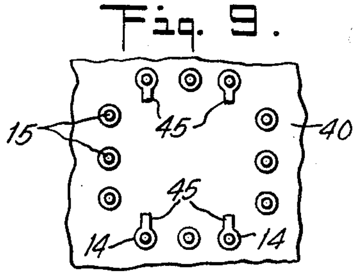

FIG. 5 is a plan view, and FIG. 6 an elevational view, of a jig construction which may be used in the apparatus of FIG. 1 to print one surface of a micro-module with lands and conductors of the configuration illustrated in FIG. 7 and useful in fabricating surface resistors on such surface as illustrated in FIG. 8; and FIG. 9 is a plan view illustrating a further jig construction suitable for printing preselected elongated peripheral lands on a micro-module as illustrated in FIG. 10 and useful in fabricating surface resistors as illustrated in FIG. 11.

In accordance with the invention, a liquid is deposited onto a surface of an object such as a micro-module by initially immersing the upper end of an upright member in a liquid and, after drawing the member of excess liquid, placing the surface on and in direct contact with the end of the liquid-coated member to effect transfer of the liquid from the end of said member to that portion of the surface in direct contact therewith. Further, the upper end of the upright member may be provided with an upright pin of smaller cross-section than a corresponding aperture or peripheral notch through which the pin projects when the surface is placed upon the upright member, whereby the pin has a small spacing from the wall surface of the aperture or groove and effects transfer of a uniform amount of the liquid onto such wall surface of said object in direct contact with and in close proximity to said pins.

The practice of this invention is particularly applicable for effecting the precise, uniform application or deposition of a liquid, such as a paint or a metal-containing liquid capable of being treated, such as by heat treatment, to deposit or leave behind an electrically conductive residue or film onto selected areas of miniature electronic or electrical components.

Referring now to the accompanying drawings which illustrate the practice of this invention, there is illustrated therein a reservoir or container 10 fixed with other components hereinafter described to a base plate 12 and partially filled with the liquid 11, such as a silver paint. Supported upon the bottom of the reservoir 10 is a plurality of upright members or studs 14 mounted or arranged in a suitable array or pattern. As illustrated in FIG. 3 of the drawings, these upright members 14 which may be any suitable shape, such as cylindrical or conical, and which may have any suitable cross-section, such as square, rectangular or circular, have fitted to the upper ends thereof a pin 15. Pin 15, as illustrated, has a diameter substantially smaller than the diameter of the upright members 14 to which it is fixed, such as a diameter in the range 0.1–0.75 of the diameter of the upright member at the location thereof to which pin 15 is fixed.

Reservoir 10 is provided with an orifice or opening 16 near the bottom thereof. Opening 16 of reservoir 10 is in fluid communication via conduit 18 with the interior of cylinder 19, which, together with conduit 18, is filled with liquid 11, the same liquid as the liquid within reservoir 10. Provided within cylinder 19 in fluid-tight piston-cylinder relationship is piston 20 to which is fixed piston rod 21. By moving piston 20 back and forth within cylinder 19 liquid is caused to move in and out of reservoir 10 thereby varying the liquid level 22 therein. More specifically, by moving piston 20 in the direction to displace liquid from cylinder 19 into reservoir 10 the liquid level 22 within reservoir 10 is increased in height. Also, by moving piston 20 away from reservoir 10 liquid 11 is caused to flow from reservoir 10 via conduit 18 into the interior of cylinder 19 thereby reducing the height of liquid level 22 within reservoir 10.

In association with reservoir 10 and positioned therein and above the upper ends of pins 15 is open frame 24 which is provided with suitable holding or support means such as radially inwardly projecting platforms 25 having corner frames 25*a* fixed to their ends to provide corner supporting and locating surfaces having close positional tolerances with respect to the members 14 and pins 15.

Open frame 24 is fixed to the lower end of a depending arm 26 which, in turn, is fixed at its upper end to one end of a lever arm 28. The other end of the lever arm 28 is pivotally mounted on a pin 29 carried by a support member 30. A spring 31 is positioned directly beneath the lever arm 28 and engages a filler piece 32 at a socket 32*a* thereof to bias the lever arm 28 in an upward direction, thereby to bias the frame 24 to a position above the upright members 14 and pins 15. The bottom end 31*a* of the spring 31 is fixedly retained in position within a retaining cup 34.

In considering the manner in which the apparatus just described applies a liquid at selected locations onto the surface of a micro-module, the piston 20 is initially moved by applying a force to the piston rod 21 in a direction to force liquid 11 from the interior of cylinder 19 into reservoir 10 so that the liquid level 22 of liquid 11 therein rises above the upper end of the pins 15. As a result of this operation the pins 15 and the upper ends of upright members 14 are covered with liquid 11. The piston rod 21 is then moved in the opposite direction, carrying with it the piston 20 so that liquid flows from the reservoir 10 into the cylinder 19. The level 22 of the liquid within reservoir 10 is thus lowered and uncovers the pins 15 and the upper ends of the upright members 14. As a result of these operations, a small quantity or droplet of liquid 11 is deposited on the upper ends of the upright members 14 and pins 15 by reason of the surface tension of the liquid 11.

Following the wetting of the upper ends of the upright members 14 and pins 15, a micro-module 35 of wafer-like square configuration and usually of ceramic material is positioned on the frame 24 with the corners of the micro-module resting within the corner frames 25*a* and supported from beneath by the ends of the platforms 25. The lever arm 28 is then manually moved downwardly against the urging of spring 31, carrying with it the micro-module 35 until the latter contacts the upper surfaces 14*a* of upright members 14 and comes to rest and is supported thereon. A stop member comprising a flat-bottomed, wedge-shaped filler piece 36 fixed to the underside of the lever arm 28 engages a projection 38 and serves to arrest movement of the lever arm 28 and frame 24 at a position of the latter below the upper surfaces 14*a* of the members 14 but above the level 22 of the liquid 11 within the reservoir 10.

As illustrated in FIGS. 1–4 of the drawings, the micro-module 35 is provided with peripheral vertical grooves 35*a* and an aperture 35*b*. The upright members 14 and the pins 15 are positioned relative to the position of the micro-module 35 in the frame 24 so that when the micro-module 35 comes to rest on the surfaces 14*a* of the upright members 14 the pins 15 are positioned within the peripheral grooves 35*a* and the aperture 35*b* but are spaced a small distance from the wall surfaces thereof as shown more clearly in FIGS. 2 and 3.

When the micro-module 35 comes to rest upon the surfaces 14*a* of the upright members 14, liquid 11 on the latter is transferred by direct contact to the surfaces of micro-module 35 in contact with the surfaces 14*a* at the upper ends of upright members 14 to provide a land adjacent each aperture and groove. Additionally, the amount of liquid 11 carried on pins 15 and surfaces 14*a* is just right to wet the wall surfaces of the grooves 35*a* and apertures 35*b* due to surface tension and capillary forces. The frame 24 is now permitted to rise under force of the spring 31 and the micromodule 35 is removed from the frame 24 and placed aside to dry. If corresponding lands are desired on the opposite surface of the micro-module, the latter after drying is turned over and again placed in the frame 24 and the previously described operation repeated. The resulting micro-module 35 is illustrated in FIG. 4, the deposited liquid 35*c* uniformly coating the wall surfaces of the peripheral grooves and apertures of the micro-module and terminating in lands formed upon one or both of its upper and lower surfaces adjacent the grooves and apertures. For purposes of clarity of illustration in FIG. 4, the film resulting from the liquid deposit is shown as having substantial thickness but it will be understood that in practice the film will be relatively thin. The micro-module after drying is placed in a heat oven to be conventionally heat treated for purposes of removing the volatile constituents of the liquid used and adhering the deposited film firmly to the surfaces of the micro-module. The liquid 11 may be any conventional silver paint thinned to have slightly less than commercial "silk screen" viscosity.

For simplicity of illustration, the upright members 14 are indicated in FIG. 1 as being affixed to the floor of the reservoir 10. In practice, however, the upright members 14 are fixedly assembled to a base plate as a form of jig structure. This jig is accurately positioned on the floor of the reservoir 10, as by use of conventional locating pins, with respect to the position of the micro-module 35 in the frame 24. Such jig construction is shown more clearly in the modified jig configuration illustrated in FIGS. 5 and 6 wherein the upright members 14 are fixedly secured, as by brazing or soldering or the like, to a base plate 40 having corner apertures 41 engaged by locating pins (not shown) provided as earlier mentioned in the floor of the reservoir 10. By way of illustrating the wide utility of the present invention, four of the upright members 14 are shown provided with vanes 42 secured thereto in any suitable manner such as by brazing or soldering and having upper surfaces 42*a* coplanar with the surfaces 14*a* of the members 14. The position which a micro-module will have upon engaging the upright members 14 as earlier described is indicated in FIGS. 5 and 6 in broken lines.

The jig configuration of FIGS. 5 and 6 has utility in forming conductive wall surfaces and adjacent surface lands on each of plural peripheral grooves 35*a* of a micro-module 35, as illustrated in FIG. 7, while concurrently forming conductive elongated lands 35*d* which extend from preselected ones of the peripheral grooves 35*a* across one surface of the micro-module. These extended conductive lands 35*d* may be used, for example, in fabricating on the surface of the micro-module a metal film resistor as illustrated in FIG. 8. To this end, there is deposited upon the surface of the micro-module in over-lapping relation to adjacent ones of the extended lands 35*d* a metal film solution. The latter may have a composition, and be heat treated, as more fully disclosed in the copending application of Bajars et al., Serial Number 94,492, filed March 9, 1961, entitled Metal Film Resistor, and assigned to the same assignee as the present application. The resultant resistive film 43 is in electrically conductive engagement at its ends with adjacent ones of the extended lands 35*d* and forms an electrically resistive path therebetween. Such resistive film may be deposited to provide an aproximate preselected value of resistance, or may include plural calibrating resistive portions 43*a* at each end which by manual removal of one or more thereof may effect adjustment of the resistor to a preselected calibration value.

FIG. 9 illustrates a modified form of jig having relatively short vanes 45 formed integral with preselected ones of the upright members 14. This configuration of jig prints short elongated lands 46 (FIG. 10) on the planar surface of a micro-module 35 adjacent preselected ones of its peripheral grooves. These short elongated lands 46 are useful, for example, in fabricating a dual metallic film resistor such as that illustrated in FIG. 11 where a metallic film resistor 48 formed on the surface of the micro-module by use of a solution and process disclosed in the aforementioned Bajars et al. application extends between and is in electrically conductive engagement with individual pairs of the elongated lands 46. The uniformity and precision with which the conductive film on the walls of the peripheral grooves of the micro-module 35 and the configuration of their associated surface lands may be formed, readily enables multiple films and lands to be quickly and precisely fabricated. Further, the lands may have very close space and configuration tolerances with no danger that they will inadvertantly extend into electrical engagement with circuit conductors or circuit components formed on a surface of the micro-module. For example, the lands of the micro-module illustrated in FIG. 11 may readily be formed with close space tolerances to the metal film resistors 48 yet with no danger that a land other than the elongated lands 46 shall make electrical engagement with the resistors 48.

It will be apparent from the foregoing description of the invention that the invention enables localized conductive films to be rapidly and precisely formed at preselected positions and of various preselected configurations on the surface of a body such as a micro-module. The invention also enables the rapid and accurate formation of a conductive film having uniform film thickness on the wall surfaces of peripheral grooves and apertures of a wafer-like body, such film if desired terminating at one or more lands formed on one or both surfaces of a wafer adjacent each peripheral groove or aperture. Accordingly, the invention provides a method and apparatus particularly suitable for fabricating rapidly, accurately and at low cost, relatively small micro-modular electrical components having relatively small physical size of the order of ⅛ inch to ¼ inch and a thickness of only a few thousandths of an inch.

While specific forms of invention have been described for purposes of illustration, it is contemplated that numerous changes may be made without departing from the spirit of the invention.

I claim:

1. Apparatus for applying an electrically conductive pattern having a precise location, arrangement, and thickness, to a micro-module object wherein the pattern constitutes a solid substance produced from a corresponding liquid substance, said apparatus comprising a chamber adapted to accommodate a quantity of said liquid substance; a substantially horizontal upwardly facing surface located within said chamber and having sharply defined borders describing said pattern; means for selectively varying the height of said liquid substance above and below the level of said surface so as to load said surface with a precise amount of liquid; holding means adapted to releasably hold said object in a precisely determined orientation relative to said surface; application means adapted to lower said object into substantially flush contact with said surface and to raise said object away from contact with said surface.

2. Apparatus for applying an electrically conductive pattern having a precise location, arrangement, and thickness, to a micro-module object wherein the pattern constitutes a solid substance produced from a corresponding liquid substance, said apparatus comprising a chamber adapted to accommodate a quantity of said liquid substance; a substantially horizontal and upwardly facing surface located within said chamber and describing said pattern, the borders of said surface being sharply defined by downwardly sloping areas; means for selectively varying the height of said liquid substance above and below the level of said surface so as to load said surface with a precise amount of liquid by surface tension liquid film-thickness determinatiton effect; holding means adapted to releasably hold said object in a precisely determined orientation relative to said surface; application means adapted to lower said object into substantially flush contact with said surface and to raise said object away from contact with said surface.

3. Apparatus for applying an electrically conductive pattern having a precise location, arrangement and thickness, to a micro-module object wherein the pattern constitutes a solid substance produced from a corresponding liquid substance, said apparatus comprising a chamber adapted to accommodate a quantity of said liquid substance; a substantially horizontal and upwardly facing surface located within said chamber and describing said pattern, the borders of said surface being sharply defined by downwardly sloping areas; means for selectively varying the height of said liquid substance above and below the level of said surface so as to load said surface with a precise amount of liquid by surface tension liquid film-thickness determination effect; holding means supporting said object against gravity in a precisely determined orientation relative to said surface; application means adapted to lower said holding means with said object cradled therein until said object rests free of said holding means and substantially flush upon said surface, and to raise said holding means up to said object and thereupon to raise both said holding means and said object again cradled therein away from said surface.

4. Apparatus for applying an electrically conductive pattern having a precise location, arrangement, and thickness, to a micro-module object wherein the pattern constitutes a solid substance produced from a corresponding liquid substance, and wherein said pattern includes apertures in and peripheral grooves about said object, said apparatus comprising a chamber adapted to accommodate a quantity of said liquid substance; a substantially horizontal upwardly facing surface located within said chamber and having sharply defined borders describing said pattern, said surface having a plurality of upwardly extending pins, each said pin corresponding to one of said apertures in and peripheral grooves about said object; means for selectively varying the height of said liquid substance above and below the level of said surface so as to load said surface with a precise amount of liquid by surface tension liquid film-thickness determination effect; holding means adapted to releasably hold said object in a precisely determined orientation relative to said surface and pins; application means adapted to lower said object into substantially flush contact with said surface so that said pins lie in closely spaced relation along and within respectively said peripheral grooves and apertures in said object and to raise said object away from contact with said surface.

5. Apparatus for applying an electrically conductive pattern having a precise location, arrangement, and thickness, to a micro-module object wherein the pattern constitutes a solid substance produced from as corresponding liquid substance, and wherein said pattern includes apertures in and peripheral grooves about said object, said apparatus comprising a chamber adapted to accommodate a quantity of said liquid substance; a substantially horizontal and upwardly facing surface located within said chamber and describing said pattern, the borders of said surface being sharply defined by downwardly sloping area, said surfaces having a plurality of upwardly extending pins, each said pin corresponding to one of said apertures in and peripheral grooves about said object; means for selectively varying the height of said liquid substance above and below the level of said surface so as to load said surface with a precise amount of liquid by surface tension liquid film-thickness determination effect; holding means adapted to releasably hold said object in a precisely determined orientation relative to said surface and pins; application means adapted to lower said object into substantially flush contact with said surface so that said pins lie in closely spaced relation along and within respectively said peripheral grooves and apertures in said object and to raise said object away from contact with said surface.

6. Apparatus for applying an electrically conductive pattern having a precise location, arrangement, and thickness, to a micro-module object wherein the pattern constitutes a solid substance produced from a corresponding liquid substance, and wherein said pattern includes apertures in and peripheral grooves about said object, said apparatus comprising a chamber adapted to accommodate a quantity of said liquid substance; a substantially horizontal and upwardly facing surface located within said chamber and describing said pattern, the borders of said surface being sharply defined by downwardly sloping areas, said surface having a plurality of upwardly extending pins, each said pin corresponding to one of said apertures in and peripheral grooves about said object, said pins each being of greater height than the thickness of the corresponding portion of said object; means for selectively varying the height of said liquid substance above and below the level of said surface so as to load said surface with a precise amount of liquid by surface tension liquid film-thickness determination effect; holding means supporting said object against gravity in a precisely determined orientation relative to said surface and said pins; application means adapted to lower said holding means with said object cradled therein until said object rests free of said holding means and substantially flush upon said surface so that said pins lie in closely spaced relation along and within respectively said peripheral grooves and apertures in said object, and to raise said holding means up to said object and thereupon to raise both said holding means and said object again cradled therein away from said surface.

References Cited by the Examiner

UNITED STATES PATENTS

| | | | |
|---|---|---|---|
| 812,329 | 2/06 | Daugherty | 113—93 X |
| 1,035,031 | 11/33 | Joslin | 118—238 X |
| 2,348,233 | 5/44 | Turnock et al. | 118—214 |
| 2,771,047 | 11/56 | Zimmerman | 118—421 X |
| 2,771,049 | 11/56 | Fish | 118—421 X |
| 2,771,050 | 11/56 | Zimmerman | 118—421 X |
| 2,848,359 | 8/58 | Talmey | 117—212 |
| 2,884,896 | 5/59 | Thayer | 118—211 |
| 2,938,939 | 5/60 | Malcolm | 174—68.5 |
| 2,964,007 | 12/60 | Buffington | 117—212 X |
| 2,966,134 | 12/60 | Stanley et al. | 118—211 |
| 2,981,611 | 4/61 | Ashworth | 117—212 |
| 2,984,697 | 5/61 | Bontecue et al. | 174—68.5 |
| 3,004,505 | 10/61 | Dvorak | 113—93 X |
| 3,017,853 | 1/62 | Hunt | 118—215 |
| 3,025,830 | 3/62 | Vierthaler et al. | 118—243 |

RICHARD D. NEVIUS, *Primary Examiner.*

BENNETT G. MILLER, JOHN P. WILDMAN, *Examiners.*

UNITED STATES PATENT OFFICE

CERTIFICATE OF CORRECTION

Patent No. 3,172,781 March 9, 1965

William A. Grill

It is hereby certified that error appears in the above numbered patent requiring correction and that the said Letters Patent should read as corrected below.

Column 6, line 14, for "determinatiton" read -- determination --; line 70, for "as" read -- a --; column 8, line 18, for "1,035,031" read -- 1,935,031 --.

Signed and sealed this 3rd day of August 1965.

(SEAL)
Attest:

ERNEST W. SWIDER
Attesting Officer

EDWARD J. BRENNER
Commissioner of Patents